United States Patent
Arulf et al.

(10) Patent No.: US 9,394,064 B2
(45) Date of Patent: Jul. 19, 2016

(54) LOAD BEARING INTERFACE RING FOR SPACECRAFT

(71) Applicant: RUAG SPACE AB, Goteborg (SE)

(72) Inventors: Orjan Arulf, Linkoping (SE); Magnus Persson, Linkoping (SE); Michael Thuswaldner, Linkoping (SE)

(73) Assignee: RUAG SPACE AB, Gothenburg (SE)

( * ) Notice: Subject to any disclaimer, the term of this patent is extended or adjusted under 35 U.S.C. 154(b) by 80 days.

(21) Appl. No.: 14/399,133

(22) PCT Filed: May 7, 2013

(86) PCT No.: PCT/EP2013/059490
§ 371 (c)(1),
(2) Date: Nov. 5, 2014

(87) PCT Pub. No.: WO2013/167593
PCT Pub. Date: Nov. 14, 2013

(65) Prior Publication Data
US 2015/0136914 A1 May 21, 2015

(30) Foreign Application Priority Data
May 9, 2012 (EP) ..................................... 12167317

(51) Int. Cl.
*B64G 1/00* (2006.01)
*B64G 1/64* (2006.01)
*B32B 37/02* (2006.01)
*B32B 37/12* (2006.01)
(Continued)

(52) U.S. Cl.
CPC ................ *B64G 1/641* (2013.01); *B32B 37/02* (2013.01); *B32B 37/1284* (2013.01); *B32B 37/16* (2013.01); *B32B 38/0004* (2013.01); *B32B 2305/076* (2013.01); *B32B 2313/04* (2013.01); *B32B 2605/00* (2013.01)

(58) Field of Classification Search
CPC .......... B64G 1/64; B64G 1/641; B32B 37/02; B32B 37/1284; B32B 37/16; B32B 38/0004; B32B 2305/076; B32B 2313/04; B32B 2605/00
See application file for complete search history.

(56) References Cited

U.S. PATENT DOCUMENTS

| | | | |
|---|---|---|---|
| 4,568,245 A | 2/1986 | Hibyan et al. | |
| 6,012,680 A * | 1/2000 | Edberg | B64G 1/641 244/173.2 |

(Continued)

FOREIGN PATENT DOCUMENTS

| | | |
|---|---|---|
| EP | 0905022 A1 | 3/1999 |
| EP | 1251066 A2 | 10/2002 |
| GB | 2173467 A | 10/1986 |

OTHER PUBLICATIONS

International Search Report and Written Opinion for PCT:EP2013:059490, filed May 7, 2013, mailed Aug. 8, 2013.

*Primary Examiner* — Philip J Bonzell
(74) *Attorney, Agent, or Firm* — Brinks Gilson & Lione

(57) ABSTRACT

The invention relates to a load bearing interface ring (1) for a space craft. The load bearing interface ring (1) comprises a first part (3) and a second part (4). The first part (3) is arranged to carry compression loads and is mounted on an inside surface (11) of the second part (4). The second part (4) is arranged to carry shear and global bending loads. The second part (4) comprises at least two laminate plies (8), where the laminate plies (8) are oriented in a normal plane (12) of a jacket surface (5) of the load bearing interface ring (1).

20 Claims, 2 Drawing Sheets

(51) Int. Cl.
 *B32B 37/16* (2006.01)
 *B32B 38/00* (2006.01)

(56) References Cited

U.S. PATENT DOCUMENTS 6,076,467 A * 6/2000 Cespedosa ............ F42B 15/36
 102/377

6,199,801 B1 * 3/2001 Wilke .................... B64G 1/641
 244/131
6,345,788 B1 * 2/2002 Shtarkman ............ B29C 70/025
 244/173.2
7,222,823 B2 * 5/2007 Thomas ................ B64G 1/641
 244/173.2
2006/0016928 A1 1/2006 Thomas et al.

* cited by examiner

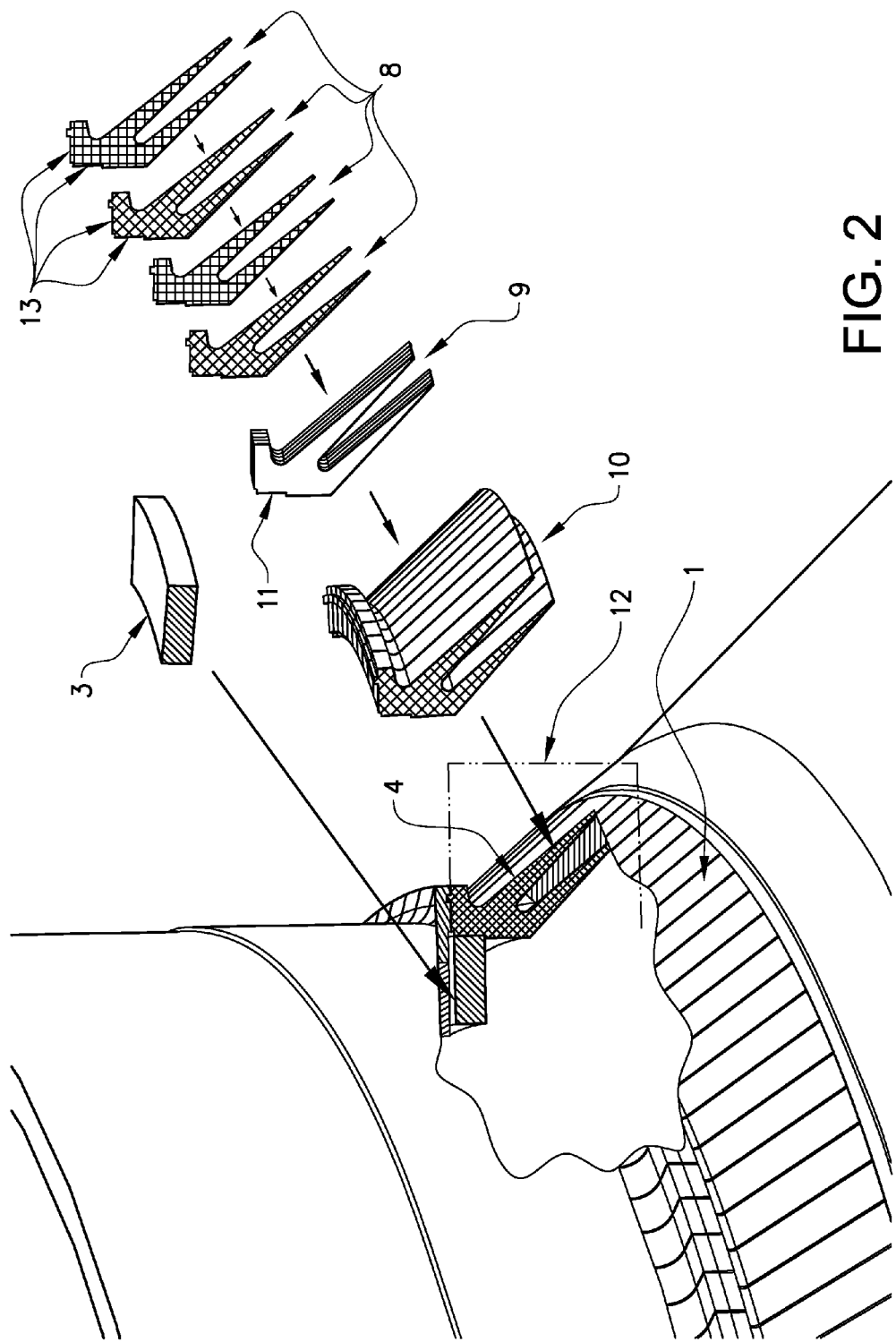

LOAD BEARING INTERFACE RING FOR SPACECRAFT

RELATED APPLICATIONS

This application claims the benefit under 35 U.S.C. §371 of International Patent Application No. PCT/EP2013/059490, having an international filing date of May 7, 2013, which claims priority to European Application No. 12167317.2, filed May 9, 2012, the contents of both of which are incorporated herein by reference in their entirety.

TECHNICAL FIELD

The invention relates to a load bearing interface ring for a space craft. The load bearing interface ring comprises a first part and a second part. The first part is arranged to carry compression loads and is mounted on an inside surface of the second part where the second part is arranged to carry shear and global bending loads over the launcher to spacecraft interface.

BACKGROUND ART

A main interface in spacecraft design is the interface ring used on payload adapters and/or satellites. These interface rings are intended to carry compression and shear loads as well as bending loads during different stages of the lifecycle of the spacecraft.

Presently these interface rings are made of metal such as aluminium. A problem with having metal is that metal is heavy and extra weight reduces the lifespan of the spacecraft as more fuel is needed to launch the spacecraft to orbit.

There is clearly a need for an improved load bearing interface ring for spacecrafts.

SUMMARY OF INVENTION

The object of the present invention is to provide an inventive load bearing interface ring for a space craft where the previously mentioned problems are at least partly avoided.

The present invention relates to a load bearing interface ring for a space craft. The load bearing interface ring comprises a first part and a second part. The first part is arranged to carry compression loads and is attached on an inside surface of the second part. The second part is arranged to carry shear and global bending loads over the launcher to spacecraft interface. The second part comprises at least two laminate plies, where at least one of the laminate plies is oriented in a normal plane of a jacket surface of the load bearing interface ring.

By having an interface ring having a second part being made up of laminate plies the weight of the interface ring can be reduced while maintaining the structural demands being set on this kind of interface ring. A reduction in weight of any device on a spacecraft means that for instance a satellite using an interface ring according to the invention needs to use less fuel to reach orbit. This means that the lifespan of the satellite increases as the fuel consumption for launch is reduced and more fuel can be allocated for on orbit station keeping. The laminate plies may be chosen such that the characteristics of the second part of the interface ring closer matches the characteristics of a corresponding interface ring made of metal.

Shear and global bending loads are loads that stride to separate the spacecraft from the launcher during ascent. They originate from inertia loads on the spacecraft mass and have to be transferred by the separation system, including the interface rings, to the launcher.

Surface areas of the interface ring that are exposed to high surface pressure can be covered by metal in order to obtain the desired friction characteristics of the interface ring.

The second part of the load bearing interface ring may comprise at least two segments of blocks, the blocks being cut from a composite material comprising fibres, the composite material comprising at least two pre-impregnated laminate plies.

The second part of the interface ring may be made up of blocks (segments), normally between 10 and 40 mm in width. Each block is cut out from a composite material or laminate, where the composite material is made up at least two laminate plies, normally between 20 and 200 pre-impregnated plies. Preferably water jet is used to cut out the blocks from the composite material. Other suitable methods for cutting the blocks may be milling, grinding, sawing or similar. Two or more blocks are then joined into segments to form the interface ring. The blocks may be joined to multiple segments, with each segment forming a part of the second part of the interface ring. The segments forming parts of the second part of the interface ring are assembled to the form the second part of the interface ring. The blocks may alternatively be joined to a single segment forming the complete second part of the interface ring. The profile of each block and thereby of the interface ring itself is known in the art.

When forming the composite material a number of pre-impregnated laminate plies comprising fibres are applied on top of each other. The composite material may be applied with the fibres in the pre-impregnated laminate plies arranged as a multidirectional weave of fibres, i.e. with the fibres in the different layers having different orientations, or as unidirectional fibres, i.e. with all fibres in every layer oriented in the same direction. During the forming of the composite material the direction of the fibres in each pre-impregnated laminate ply may be controlled in order for the desired characteristics of the composite material and in the end control of the desired characteristics of the second part of the interface ring.

The forming of the composite material does not have to be made from pre-impregnated fibre layers but can be used by other methods known in the art such as vacuum injection.

The laminate plies may comprise carbon fibre.

Using carbon fibre as the building material for the interface ring ensures that weight reduction and maintained strength and stiffness requirements are met for the interface ring.

The laminate plies may comprise fibres with the fibres being oriented 0°/90° and +45°/−45° in a normal plane of a jacket surface of the load bearing interface ring respectively.

The laminate plies comprises fibres with the fibres being oriented 0°/90° and +60°/−60° in a normal plane of a jacket surface of the load bearing interface ring respectively.

Any combination of the above described orientations or any other directions is possible.

The fibres in the at least two laminate plies may be oriented such that the fibres are quasi-isotropically oriented.

This ensures that the interface ring is capable of handling shear and global bending loads in all in-plane directions equally.

The fibres in the at least two laminate plies are oriented such that the fibres are anisotropically oriented.

This makes it possible to design an interface ring having different properties in different directions. For instance it may be possible to make the second part of the interface ring having different bending stress or stiffness characteristics in one or more specific directions.

The first part of the interface ring may be made of metal.

The first part of the interface ring may be made of layers of wound carbon fibre where the fibres in the layers of wound carbon fibre are oriented 90°±5° to a normal plane of a jacket surface of the load bearing interface ring.

Depending on design the first part may be made of either metal or wound carbon fibre.

In case of wound carbon fibre the fibres in the first part are ideally oriented 90° to a normal plane of a jacket surface of the load bearing interface ring. However, in reality small deviations from 90° are acceptable for the functionality of the first part. The first part of the interface ring is intended to carry compression loads from when a clamp is attached to keep the interface rings of an adapter to a spacecraft together in place during a launch. By using carbon fibre the weight of the first part of the interface ring is reduced.

The load bearing interface ring may be arranged to be mounted on a cylindrical interface and/or a conical interface of a space craft.

Depending on which part of the spaceship the interface ring is used the interface ring may be designed to be adapted to the specific shape of that particular part. The part may for instance be a satellite or a payload adapter. The satellite and/or the payload adapter may have a cylindrical or conical interface.

An interface ring according to the invention may be mounted on either a satellite or a payload adapter or both.

The invention further relates to a method for manufacturing a load bearing interface ring for a space craft, the load bearing interface ring comprises a first part and a second part, the first part being arranged to carry compression loads and is mounted on an inside surface of the second part, the second part being arranged to carry shear and global bending loads, characterized in that the method comprises:
- manufacturing a composite material comprising at least two laminate plies made of pre-impregnated laminate plies;
- cutting a block of laminate plies from said composite material by means of water jet cutting;
- fusing at least two blocks of laminate plies together to form a segment of blocks;
- forming the second part of the load bearing interface ring by one or more segments of blocks;
- attaching the first part of the load bearing interface ring to an inside surface of the second part of the load bearing interface ring.

The attachment of the first part of the interface ring to an inside surface of the second part of the interface ring may be made by either attaching the first part to a complete second part or by attaching the inside surface of segments of blocks to the first part, thereby forming the second part on the first part.

The method may further comprise:
- securing the first part of the load bearing interface ring to an inside surface of the second part of the load bearing interface ring using an adhesive.

The method may further comprise:
- forming each block as a straight block and fusing the at least two blocks using adhesive having a variable thickness to form the load bearing interface ring.

The method may further comprise:
- forming each block as a block having a curved inside surface and fusing the at least two blocks using adhesive having an even thickness to form the load bearing interface ring.

BRIEF DESCRIPTION OF DRAWINGS

FIG. 2 schematically shows an exploded diagram of an interface ring according to the invention.

DETAILED DESCRIPTION OF DRAWINGS

Figure 1:
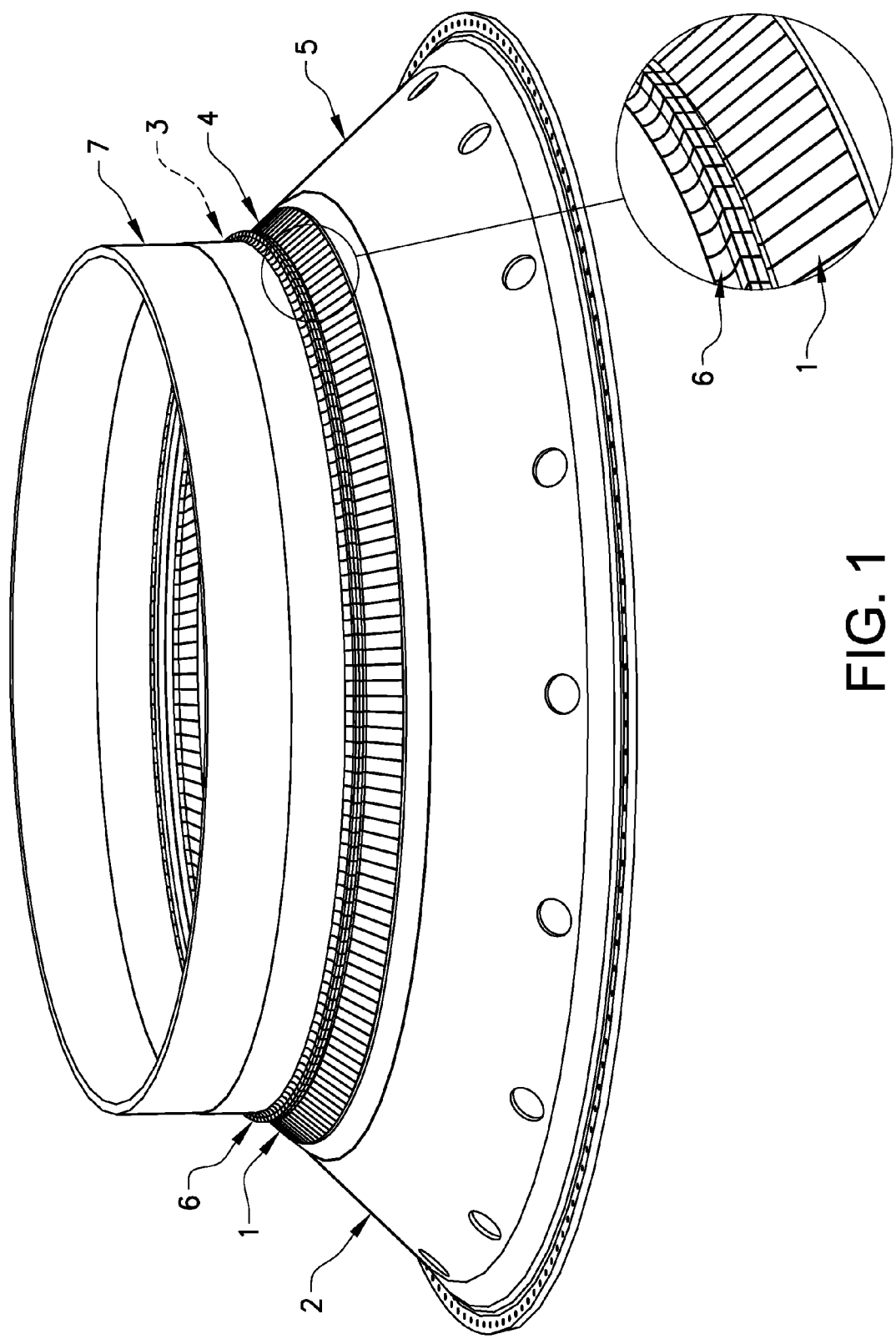
FIG. 1 schematically shows an interface ring according to the invention attached to an adapter.

FIG. 1 schematically shows an interface ring 1 according to the invention attached to a first adapter 2. The first adapter 2 may be a payload adapter or a corresponding part of a satellite. The interface ring 1 comprises a first part 3 and a second part 4. The first part 3 is positioned on an inside surface of the second part 4. An inside surface of the second part 4 of the interface ring 1 is a surface that faces the outside of the first adapter 2. This is shown in more detail in FIG. 2. The first adapter 2 has a vertical jacket surface 5 extending the entire circumference of the first adapter 2. In FIG. 1 a corresponding interface ring 6 attached to a second adapter 7 is shown. The corresponding interface ring 6 cooperates with the interface ring 1 in order to connect the first adapter 2 and the second adapter 7. The second adapter 7 may be a payload adapter or a corresponding part of a satellite. The shape of the corresponding interface ring 6 is known in the art. The corresponding interface ring 6 may be made in the same way as the interface ring 1 according to the invention or be made of another material such as aluminium.

FIG. 2 schematically shows an exploded diagram of an interface ring 1 according to the invention.

As can be seen from FIG. 2 the second part 4 of the interface ring 1 is made up of laminate plies 8. The laminate plies 8 together form a block 9; two or more blocks 9 in turn form a segment 10. The segment 10 can be one of several segments being joined making up the second part 4 of the interface ring 1. The second part 4 of the interface ring 1 may also be manufactured so that the second part 4 of the interface ring 1 is formed as one complete segment 10 of blocks 9.

The first part 3 of the interface ring 1 can in FIG. 2 be seen position on an inside surface 11 of the second part 4.

With a laminate ply 8 is meant a thin layer of material. The material may for instance be plastic, carbon fibre, metal or any other material that can be made into thin sheets. Each ply may also be a composite of two or more materials.

As is illustrated in FIG. 2 at least one laminate ply 8 is oriented in a normal plane 12 to the jacket surface 5. Another way of describing this is that at least one of the laminate plies 8 is oriented radially outwards from the jacket surface 5 of the first adapter 2. The normal plane 12 may be a vertical normal plane to the jacket surface 5.

The laminate plies 8 in FIG. 2 schematically show fibres 13 embedded in the laminate plies 8. The laminate plies 8 in FIG. 2 illustrate one way to orient the fibres 13 in the laminate plies 8 in order to achieve the desired properties of the first part 3 of the interface ring 1. In FIG. 2 the fibres 13 are oriented at 0°/90° and +45°/−45° in a normal plane 12 of a jacket surface 5 of the load bearing interface ring 1 respectively. The fibres 13 of every other laminate ply 8 have 0°/90° orientation and the fibres 13 of every other laminate ply 8 have a +45°/−45° orientation. By arranging the fibres 13 in this way the fibres are quasi-isotropically oriented. Other orientations of the fibres 13 in the laminate plies 8 are possible, for instance 0°/90° and +60°/−60°. Any combination of laminate plies 8 having the above described orientations or other orientations is possible. It is possible to arrange the laminate plies 8 such that the second part 4 of the interface ring 1 exhibits anisotropic characteristics.

Also seen in FIG. 2 is the first part 3 being attached to an inside surface 11 of the second part 4, for instance by means of adhesive or other means.

The way of manufacturing the interface ring 1 will now be described in more detail. The second part 4 is manufactured by first manufacturing a composite material comprising at least two pre-impregnated laminate plies 8. During the manufacturing of the composite material laminate pre-impregnated plies 8 having the above different fibre orientations are arranged on top of each other in order to build a material with desired characteristics.

Thereafter a block 9 of laminate plies 8 is cut from said composite material preferably by means of water jet cutting. Other suitable methods may be milling, grinding, sawing or similar. The shape of the laminate plies 8 in FIG. 2 is intended as a mere illustration as individual laminate plies 8 are not handled during the manufacturing process. Instead blocks 9 having a width W of typically between 10 and 40 mm are used. Blocks 9 having a greater width than 40 mm are possible although problems with exothermic reactions during curing of the laminate are common for blocks 9 of laminate plies 8 with a greater width. Also blocks 9 having a width that is smaller than 10 mm are possible although the narrower the block 9 the more difficult they are to handle.

The shape of the blocks 9 cut out by the water jet is known in the art and depends on the type of payload adapter or satellite that the invention is intended for.

The continued manufacturing of the second part 4 is made by fusing at least two blocks 9 of laminate plies 8 together to form a segment 10 of blocks 9. The second part 4 of the interface ring 1 is then formed by one or more segments 10 of blocks 9. To complete the interface ring 1 the first part 3 of the load bearing interface ring 1 is attached to an inside surface 11 of the second part 4 of the load bearing interface ring 1.

The attachment of the first part 3 of the interface ring 1 to an inside surface 11 of the second part 4 of the interface ring 1 may be made by either attaching the first part 3 to a completed second part 4 or by attaching the inside surface 11 of a segment 10 of blocks 9 to the first part 3, thereby forming the second part 4 on the first part 3.

During the manufacturing of the second part 4 of the interface ring 1 each block 9 or segment 10 may be formed as a straight block or segment. When fusing two straight blocks or segments together adhesive having a variable thickness along the length of the block or segment is used to form the load bearing interface ring. The desired curvature of the block or segment to form the ring is thus achieved by applying a smaller amount of adhesive closer to the inside surface of the block or segment and applying a greater amount of adhesive the farther away from the inside surface of the block or segment the adhesive is applied.

Alternately each block 9 or segment 10 of the interface ring 1 is formed as a block or segment having a curved inside surface. When fusing two curved blocks or segments together adhesive having an even thickness along the length of the block or segment is used to form the load bearing interface ring. The desired curvature of the block or segment to form the ring is thus achieved by cutting the block from the composite material in the desired shape.

Due to that the blocks 9 have a width of between 10 and 40 mm each ply may not be oriented in a normal plane 12 to the jacket surface 5 depending on the manufacturing process and the joining of blocks 9 to segments 10. A deviation of the orientation of the plies 8 that are at the edge of a block 9 from the normal plane 12 may be between 1° and 5°. However, at least one ply 8 in a block 9 will always be oriented in a normal plane 12 to the jacket surface 5.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description thereto are to be regarded as illustrative in nature, and not restrictive.

The invention claimed is:

1. A load bearing interface ring for a space craft, the load bearing interface ring comprising:
   a first part, and
   a second part,
   wherein the first part is configured to carry compression loads and is attached on an inside surface of the second part, the second part is configured to carry shear and bending loads, wherein the second part of the load bearing interface ring comprises at least one segment of blocks, the blocks being cut from a composite material comprising fibers, the composite material comprising at least two pre-impregnated laminate plies, where at least one of the laminate plies is oriented in a normal plane of a jacket surface of the load bearing interface ring.

2. The load bearing interface ring according to claim 1, wherein the first part is made of metal.

3. The load bearing interface ring according to claim 1, wherein the first part is made of layers of wound carbon fiber, where the fibers in the layers of wound carbon fiber are oriented 90°±5° to a normal plane of a jacket surface of the load bearing interface ring.

4. The load bearing interface ring according to claim 1, wherein the load bearing interface ring is configured to be mounted on a cylindrical interface and/or a conical interface of a space craft.

5. A payload adapter comprising a load bearing interface ring according to claim 1.

6. The load bearing interface ring according to claim 1, wherein the laminate plies comprise carbon fiber.

7. The load bearing interface ring according to claim 6, wherein the laminate plies comprise fibers oriented 0°/90° and/or +45°/−45° in a normal plane of a jacket surface of the load bearing interface ring, respectively.

8. The load bearing interface ring according to claim 6, wherein the laminate plies comprise fibers oriented +60°/−60° in a normal plane of a jacket surface of the load bearing interface ring, respectively.

9. The load bearing interface ring according to claim 6, wherein the fibers in the at least two laminate plies are oriented such that the fibers are quasi-isotropically oriented.

10. The load bearing interface ring according to claim 6, wherein the fibers fibres in the at least two laminate plies are oriented such that the fibers are anisotropically oriented.

11. A satellite comprising a load bearing interface ring according to claim 1.

12. The satellite comprising according to claim 11, wherein the laminate plies comprise carbon fiber.

13. The satellite comprising according to claim 11, wherein the laminate plies comprise fibers oriented 0°/90° and/or +45°/−45° in a normal plane of a jacket surface of the load bearing interface ring, respectively.

14. The satellite comprising according to claim 11, wherein the laminate plies comprise fibers oriented +60°/−60° in a normal plane of a jacket surface of the load bearing interface ring, respectively.

15. The satellite comprising according to claim 11, wherein the fibers in the at least two laminate plies are oriented such that the fibers are quasi-isotropically oriented.

16. The satellite comprising according to claim 11, wherein the fibers in the at least two laminate plies are oriented such that the fibers are anisotropically oriented.

17. A method for manufacturing a load bearing interface ring for a space craft, the method comprising:
- providing a load bearing interface ring that defines a ring-shape, wherein the load bearing interface ring comprises a first part and a second part, the first part is configured to carry compression loads and is mounted on an inside surface of the second part, the second part is configured to carry shear and bending loads;
- manufacturing a composite material comprising at least two laminate plies made of pre-impregnated laminate plies;
- cutting a block of laminate plies from said composite material with a water jet cutter;
- fusing at least two blocks of laminate plies together to form a segment of blocks;
- forming the second part of the load bearing interface ring by one or more segments of blocks; and
- attaching the first part of the load bearing interface ring to an inside surface of the second part of the load bearing interface ring.

18. The method according to claim 17, further comprising:
- securing the first part of the load bearing interface ring to an inside surface of the second part of the load bearing interface ring using an adhesive.

19. The method according to claim 17, further comprising:
- forming each block as a block having a straight inside surface and fusing the at least two blocks using adhesive having a variable thickness to form the load bearing interface ring.

20. The method according to claim 17, further comprising:
- forming each block as a block having a curved inside surface and fusing the at least two blocks using adhesive having an even thickness to form the load bearing interface ring.

* * * * *